(12) United States Patent
Eggleston et al.

(10) Patent No.: US 8,371,011 B2
(45) Date of Patent: Feb. 12, 2013

(54) AUTOMATED SYSTEMS FOR ROLLER RAIL DISASSEMBLY AND METHODS OF DISASSEMBLING ROLLER RAIL ASSEMBLIES

(75) Inventors: Todd N. Eggleston, Georgetown, KY (US); Brandon Scott Thompson, Brooksville, KY (US); Lonnie G. Craig, Georgetown, KY (US); Raymond Mead, Mt. Sterling, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 352 days.

(21) Appl. No.: 12/887,699

(22) Filed: Sep. 22, 2010

(65) Prior Publication Data

US 2012/0066880 A1   Mar. 22, 2012

(51) Int. Cl.
*B23P 19/00* (2006.01)
*F16C 29/06* (2006.01)
*B65G 13/00* (2006.01)

(52) U.S. Cl. ............... 29/426.1; 29/426.4; 29/426.5; 29/402.03; 29/700; 29/239; 29/253

(58) Field of Classification Search ............... 29/402.03, 29/426.1, 426.4, 426.5, 700, 239, 253
See application file for complete search history.

(56) References Cited

U.S. PATENT DOCUMENTS

| | | | | |
|---|---|---|---|---|
| 3,586,142 A * | 6/1971 | Inwood et al. | ............... | 193/35 R |
| 3,721,326 A * | 3/1973 | Bussienne | ................... | 193/35 R |
| 3,777,867 A * | 12/1973 | Durwald | ..................... | 193/35 A |
| 4,462,493 A * | 7/1984 | Nordstrom | ................... | 193/35 R |
| 4,724,009 A * | 2/1988 | Doyle et al. | ................... | 134/22.1 |
| 5,242,047 A * | 9/1993 | Bonnet | ......................... | 198/842 |
| 5,244,100 A * | 9/1993 | Regier et al. | ................... | 209/556 |
| 6,059,280 A * | 5/2000 | Yamauchi et al. | ............ | 271/109 |
| 6,105,746 A * | 8/2000 | Faisant | ......................... | 193/35 R |
| 6,189,672 B1 * | 2/2001 | Schut | ................................ | 193/35 A |
| 6,315,109 B1 * | 11/2001 | Dean | .............................. | 198/786 |
| 6,516,933 B1 * | 2/2003 | Ledingham | ................... | 193/35 F |
| 7,455,165 B2 * | 11/2008 | Lawless | ......................... | 193/37 |
| 7,467,895 B2 * | 12/2008 | Kurachi et al. | ................. | 384/51 |
| 7,506,741 B2 * | 3/2009 | Yagi et al. | ..................... | 193/35 R |
| 2004/0163925 A1 * | 8/2004 | Ledingham | ................... | 193/35 F |
| 2005/0252655 A1 * | 11/2005 | McKay et al. | ............. | 166/241.7 |
| 2012/0066880 A1 * | 3/2012 | Eggleston et al. | ........... | 29/426.1 |

\* cited by examiner

*Primary Examiner* — Derris Banks
*Assistant Examiner* — Anthony Green
(74) *Attorney, Agent, or Firm* — Dinsmore & Shohl LLP

(57) ABSTRACT

An automated system for disassembling a roller rail assembly includes an actuation device configured to move the roller rail assembly in a disassembling direction. A guide bracket is arranged and configured to receive the roller rail assembly as the roller rail assembly is moved in the disassembling direction. The guide bracket allows movement of the roller rail assembly in the disassembling direction. A separator member is located downstream of the actuation device. The separator member being received by a housing member of the roller rail assembly and having a wide region that separates sidewalls of the housing member and releases roller wheels of the roller rail assembly as the roller rail assembly is moved past the separator member by the actuation device.

20 Claims, 5 Drawing Sheets

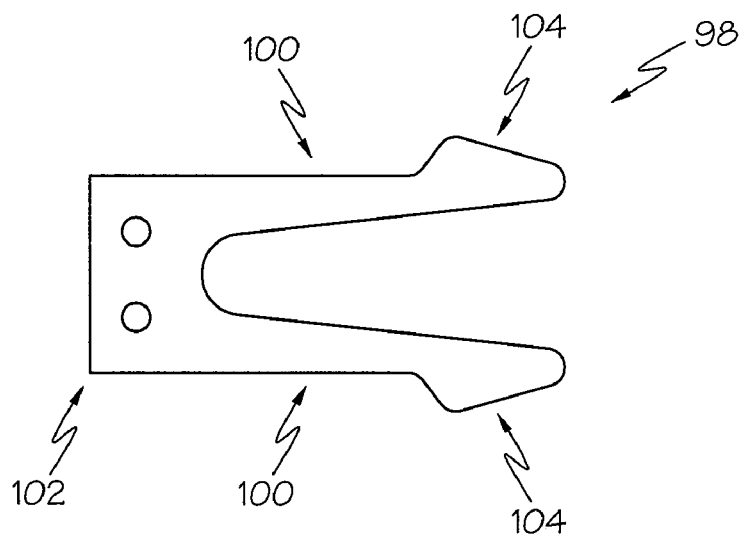
FIG. 4
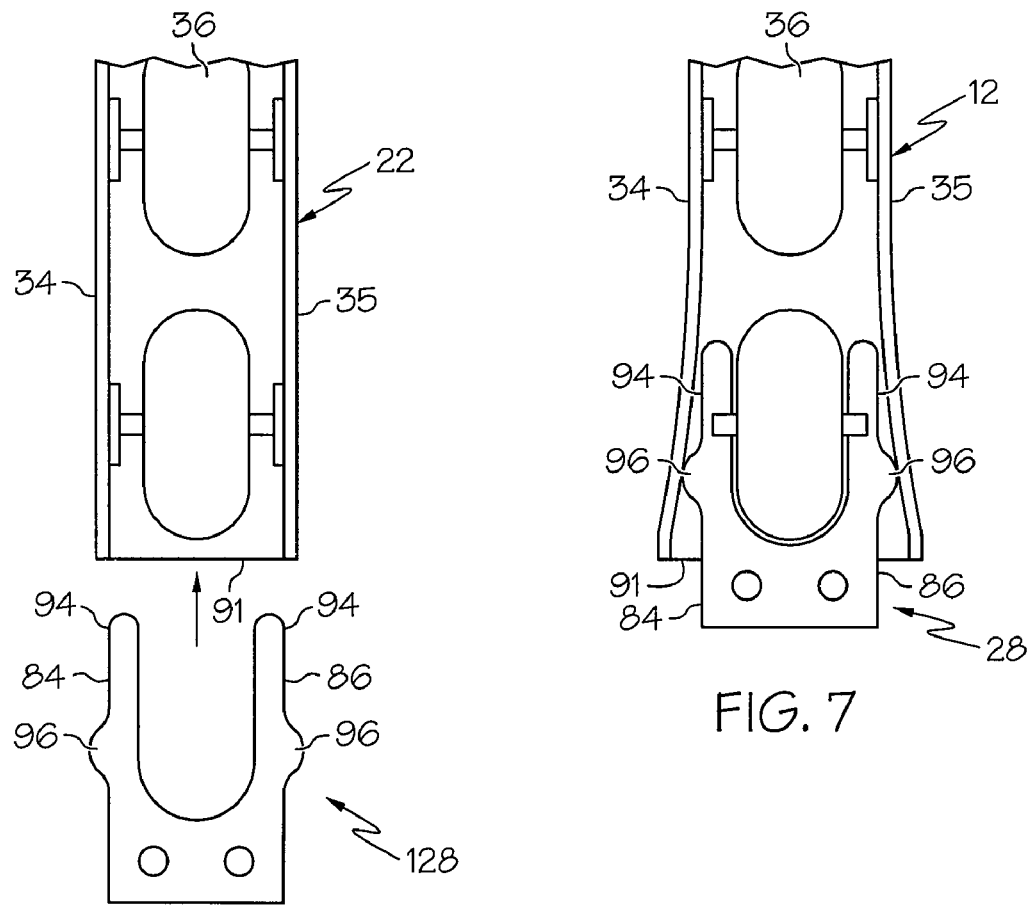
FIG. 6
FIG. 7

US 8,371,011 B2

AUTOMATED SYSTEMS FOR ROLLER RAIL DISASSEMBLY AND METHODS OF DISASSEMBLING ROLLER RAIL ASSEMBLIES

TECHNICAL FIELD

The present specification generally relates to automated systems for roller rail disassembly and methods of disassembling roller rail assemblies.

BACKGROUND

Various shelving systems and conveyors may utilize a roller-type element, such as a roller wheel, to facilitate movement of goods or parts from one location to another along the shelving systems or conveyors. One example is a gravity feed shelving system that allows a rearward located good to feed forward once a forward located good is removed from the shelving system.

Some roller rail assemblies include removable rollers or wheels. The rollers or wheels may be removably fixed in a support. For example, it is known to provide snap-fit engagement sockets for removably securing the wheels within the sockets. The wheels may be removed from the sockets by hand by pulling on the wheels and overcoming the snap-fit engagement.

SUMMARY

In one embodiment, an automated system for disassembling a roller rail assembly includes an actuation device configured to move the roller rail assembly in a disassembling direction. A guide bracket having an opening configured to receive the roller rail assembly as the roller rail assembly is moved in the disassembling direction. The guide bracket allows movement of the roller rail assembly in the disassembling direction. A separator member is located downstream of the actuation device. The separator member being received by a housing member of the roller rail assembly and having a wide region that separates sidewalls of the housing member and releases roller wheels of the roller rail assembly as the roller rail assembly is moved past the separator member by the actuation device.

In another embodiment, an automated system for disassembling a roller rail assembly includes an actuation device configured to move the roller rail assembly in a disassembling direction. A guide bracket is having an opening configured to receive the roller rail assembly as the roller rail assembly is moved in the disassembling direction. The guide bracket allows movement of the roller rail assembly in the disassembling direction. A separator member is located downstream of the actuation device. The separator member having a wide region that releases roller wheels of the roller rail assembly as the roller rail assembly is moved past the separator member by the actuation device. A collecting and sorting assembly is configured to receive the roller wheels and provide separate pathways for axle pins of the roller wheels and wheel portions of the roller wheels.

In another embodiment, a method of disassembling a roller rail assembly comprises moving the roller rail assembly in a disassembling direction using an actuation device; guiding movement of the roller rail assembly using a guide bracket configured to receive the roller rail assembly as the roller rail assembly is moved in the disassembling direction; and separating roller wheels of the roller rail assembly from a housing member of the roller rail assembly using a separator member, the separator member being located downstream of the actuation device, the separator member being received by the housing member of the roller rail assembly and having a wide region that separates sidewalls of the housing member and releases roller wheels of the roller rail assembly as the roller rail assembly is moved past the separator member by the actuation device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 is a top view of another embodiment of a separator member for use with the automated system of FIG. 2;

FIG. 6 illustrates the separator member of FIG. 3 prior to entering the roller rail assembly according to one or more embodiments described herein; and FIG. 7 illustrates the separator member of FIG. 3 entering the roller rail assembly and separating the sidewalls of the roller rail assembly according to one or more embodiments described herein.

DETAILED DESCRIPTION

Embodiments described herein generally relate to automated systems and methods for disassembling roller rail assemblies. The automated systems may include an actuator device for moving the roller rail assemblies toward a separator member, which is used to separate roller wheels from the roller rail assemblies. The roller rail assemblies may include a column of roller wheels that are removably mounted within a housing member. Because various components of the roller rail assemblies may be formed of different materials (e.g., the roller wheels may be formed of a plastic and/or rubber material and the housing member may be formed of a metal material), it may be useful to separate and sort at least some of the components when disassembling the roller rail assemblies. The automated systems described herein can be used to automatically disassemble the roller rail assemblies and sort various components of the roller rail assemblies.

Figure 1:
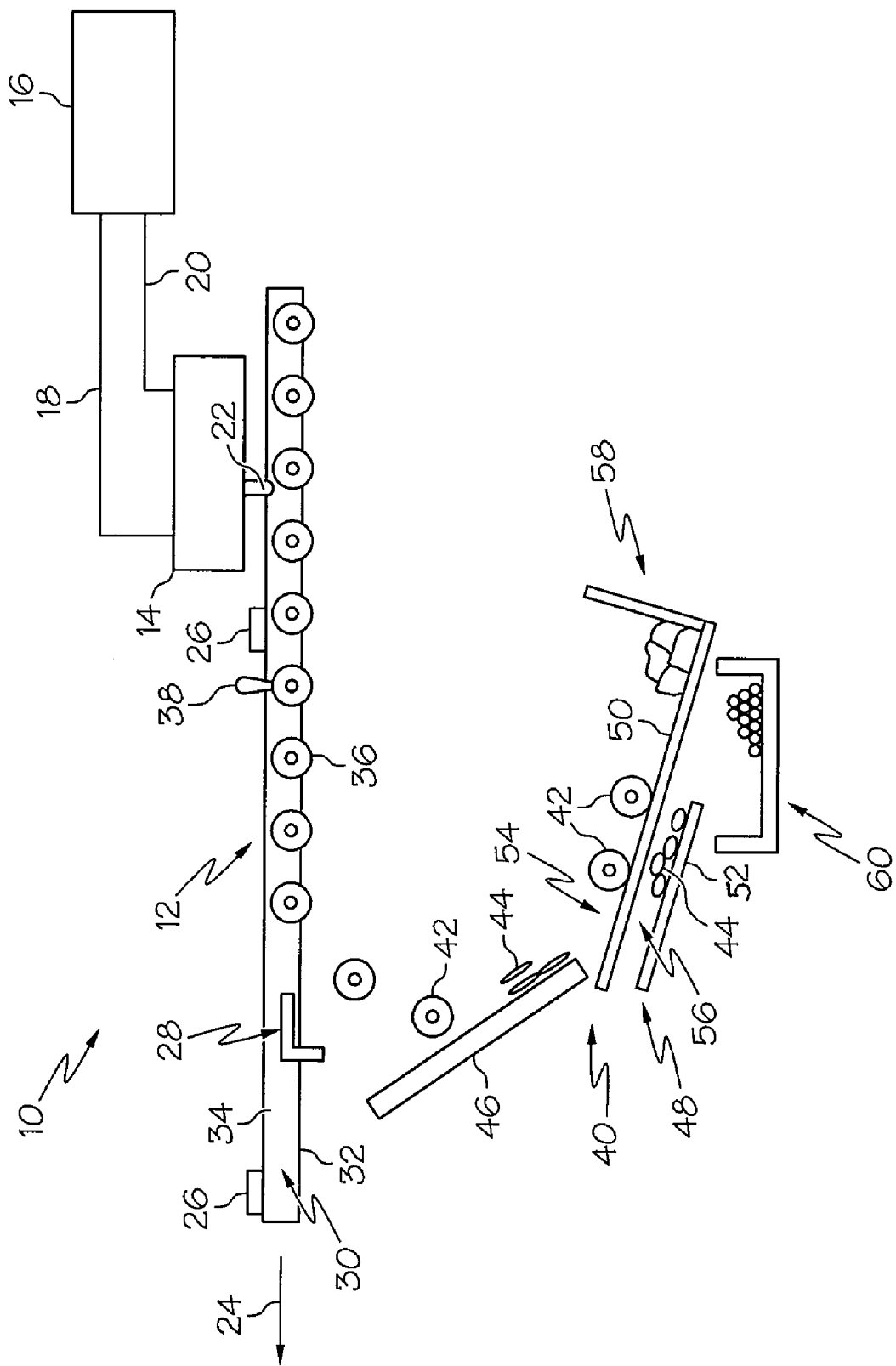
FIG. 1 is a diagrammatic view of an automated system used in disassembling a roller rail assembly according to one or more embodiments described herein.

Referring to FIG. 1, the exemplary automated system 10 is used in disassembling the roller rail assembly 12 (illustrated in section). The automated system 10 includes the actuation device 14 that is capable of moving the roller rail assembly 12 in a linear, disassembling direction. In some embodiments, the actuation device 14 may be a pneumatic or hydraulic device that is connected to a pressurized fluid source 16 (e.g., air) via lines 18 and 20. The actuation device 14 may include an engagement member 22 capable of reciprocal action that engages the roller rail assembly 12 and moves the roller rail assembly 12 in the disassembling direction of arrow 24 during an actuation stroke and then releases the roller rail assembly 12 on a return stroke.

A guide bracket 26 may be provided that is used to guide the roller rail assembly 12 as the roller rail assembly 12 moves in the direction of arrow 24. In some embodiments, the guide bracket 26 may allow forward movement of the roller rail assembly 12 in the direction of arrow 24 and inhibit side-to-side and/or vertical movement of the roller rail assembly 12 in a direction transverse to the arrow 24.

The actuation device 14 and the guide bracket 26 may be used to feed the roller rail assembly 12 toward the separator member 28. Generally, the separator member 28 may be sized and arranged to be received within a channel 30 of the housing member 32 that is formed between sidewalls (only sidewall 34 can be seen in FIG. 1) of the housing member 32. The separator member 28 may also be sized to force the sidewalls 34 of the housing member 32 apart, thereby releasing the roller wheels 36 as they approach the separator member 28, as will be described in greater detail below.

In some embodiments, a pusher element 38 may be used to apply a downward force against the roller wheels 36 as the roller wheels 36 approach the separator member 28. As one example, the pusher element 38 may be hingedly connected to a frame of the automated system 10. The pusher element 38 may ride along the housing member 32 under the force of gravity as the roller rail assembly 12 is pushed in the direction of the arrow 24 by the actuation device 14. In some embodiments, the pusher element 38 may be spring-biased downward toward the roller rail assembly 12. The housing member 32 may have openings through which the pusher element 38 can pass and apply a force against the roller wheels 36.

Once the roller wheels 36 are released from the housing member 32, they may fall, e.g., under the influence of gravity toward a collecting and sorting assembly 40. The roller wheels 36 may include a wheel portion 42 and an axle pin 44 that is received in a central opening of the wheel portion 42. In some embodiments, the wheel portion 42 may be formed of a first material (e.g., plastic) and the axle pin 44 may be formed of a second, different material (e.g., metal). In some instances, the axle pin 44 may separate from the wheel portion 42 as the roller wheel 36 is released from the housing member 32 and falls toward the collecting and sorting assembly 40.

The collecting and sorting assembly 40 may include a guiding ramp member 46 that is used to direct the wheel portions 42 and axle pins 44 toward a separator ramp assembly 48. The separator ramp assembly 48 may include a first member 50 and a second member 52 beneath the first member 50. The first member 50 may be formed using a screen or mesh having openings sized large enough such that the axle pins 44 fall through the first member 50 to the second member 52. The openings may also be small enough such that the wheel portions 42 do not fall through the first member 50 to the second member 52. The second member 52 may be a solid component without any openings to allow the axle pins 44 to pass therethrough. Thus, the separator ramp assembly 48 may provide separate paths, where path 54 provides a pathway for the wheel portions 42 and path 56 provides a pathway for the axle pins 44.

The first member 50 may include a wheel collecting bin portion 58 at which the wheel portions 42 may be collected. In another embodiment, the wheel collecting bin portion 58 may be a bin or tray that is separate from the first member 50. The second member 52 may lead the axle pins 44 to a pin collecting bin 60 at which the axle pins 44 may be collected. In another embodiment, the pin collecting bin 60 may be part of the second member 52. The wheel portions 42 and separated axle pins 44 may be placed into respective containers for delivery to a recycling center.

Figure 2:
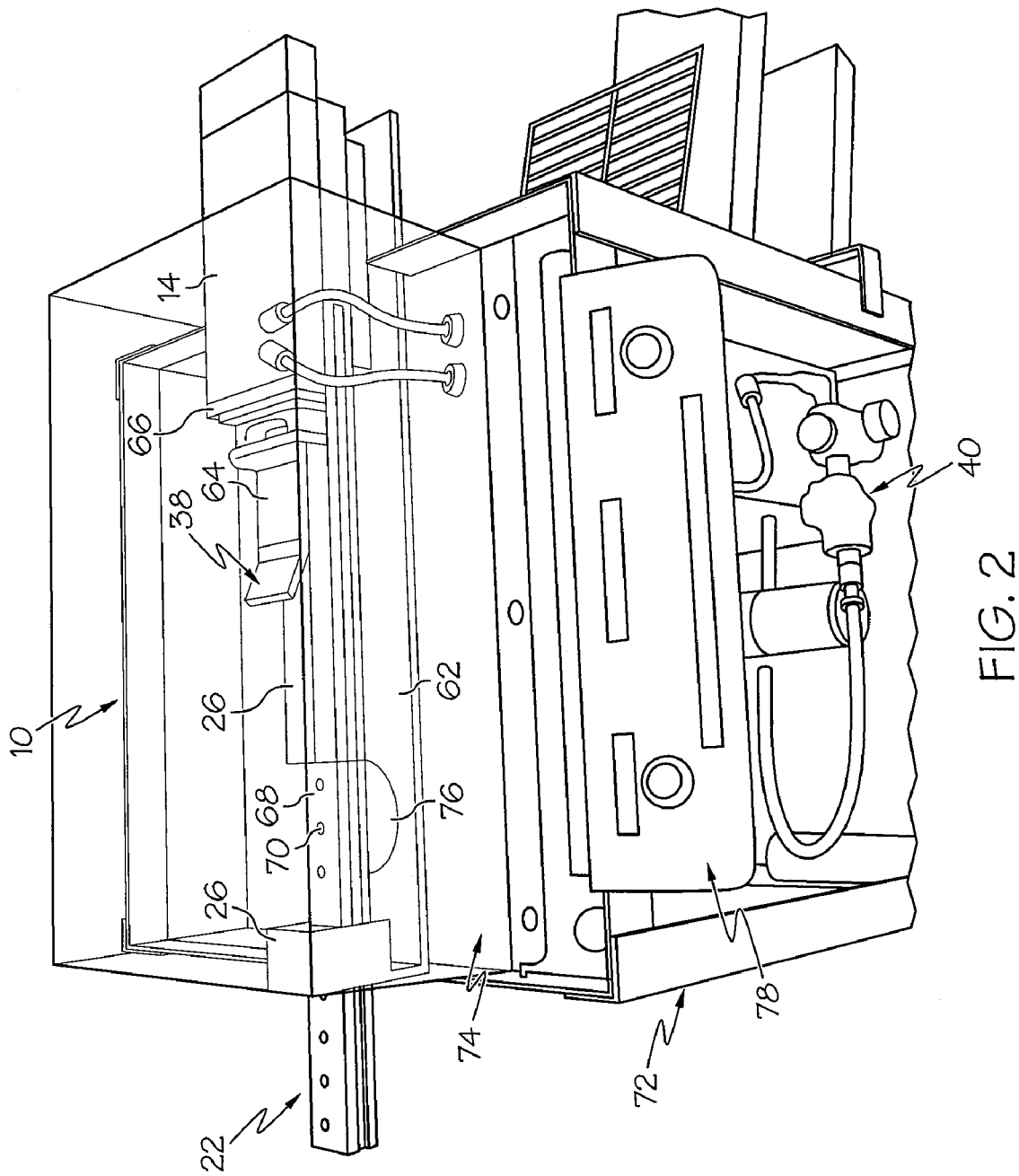
FIG. 2 is a perspective view of an automated system used in disassembling a roller rail assembly according to one or more embodiments described herein.

Referring to FIG. 2, one embodiment of the exemplary automated system 10 is shown in an assembled fashion and includes a base 62 upon which the actuation device 14 and the guide bracket 26 are mounted. The roller rail assembly 12 is moved using the actuation device 14 toward the separator member 28 (see FIG. 1). The pusher element 38 may be connected to a pivot arm 64 that is pivotably connected to a hinge support 66 that is fixedly connected to the base 62. The pusher element 38 can ride along a bottom wall 68 of the roller rail assembly 12, extending into the openings 70 to apply a pushing force to the roller wheels 36.

The automated system 10 may be supported on a support frame 72. The support frame 72 may include an upper support surface 74 on which the automated system 10 is supported. An opening 76 may be provided through the upper support surface 74 and the base 62. The opening 76 may be sized and located to receive the falling roller wheels 36 as they are separated from the housing member 32 and fall toward the collecting and sorting assembly 40. In some embodiments, a user interface 78 may be provided for use in controlling the actuation device 14 and indexing of the roller rail assembly 12. In another embodiment, the roller rail assembly 12 may be indexed automatically once the roller rail assembly 12 is input to the automated system 10.

Figure 3:
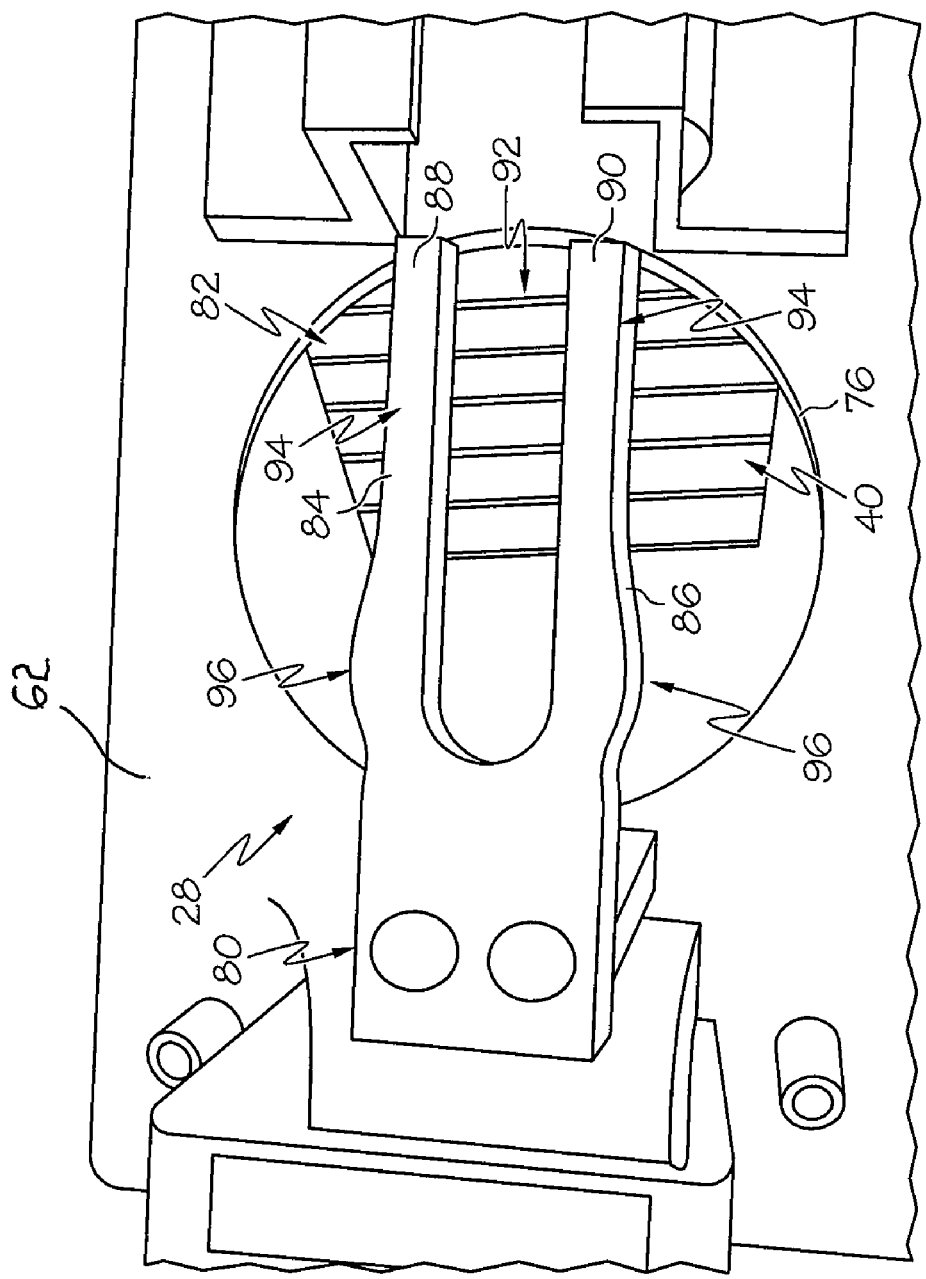
FIG. 3 is a top, detail view of a separator member for use with the automated system of FIG. 2 according to one or more embodiments described herein.

Referring to FIG. 3, the separator member 28 is shown in detail with the roller rail assembly 12 removed for clarity. The separator member 28 may be a fork-shaped member and include a mounting portion 80 that fixedly mounts to the base 62 and a spreading portion 82 extending horizontally from the mounting portion 80. The spreading portion 82 may include a pair of tongs 84 and 86 having free ends 88 and 90 that face back toward the actuation device 14. The tongs 84 and 86 are spaced-apart from each other in a cross-conveying direction thereby providing a gap 92 therebetween. The gap 92 is located above the opening 76 that is located above the collecting and sorting assembly 40.

Each tong 84 and 86 includes a narrow portion 94 and a wider portion 96. The narrow portions 94 together provide a relatively narrow region of the separator member 28 that can be inserted into the housing member 32. The wider portions 96 together provide a relatively wide region of the separator member 28 that can be used to force apart the sidewalls of the housing member 32 to release the roller wheels 36. In some embodiments, the gap 92 may be sized wider than the individual roller wheels 36 such that the roller wheels 36 can be released from the housing member 32 into the gap 92 and then down through the opening 76.

Referring to FIG. 4, another exemplary embodiment of the separator member 98 is illustrated having its narrow portions 100 located nearer to a mounting portion 102 and wider portions 104 located further from the mounting portion 102.

Figure 5:
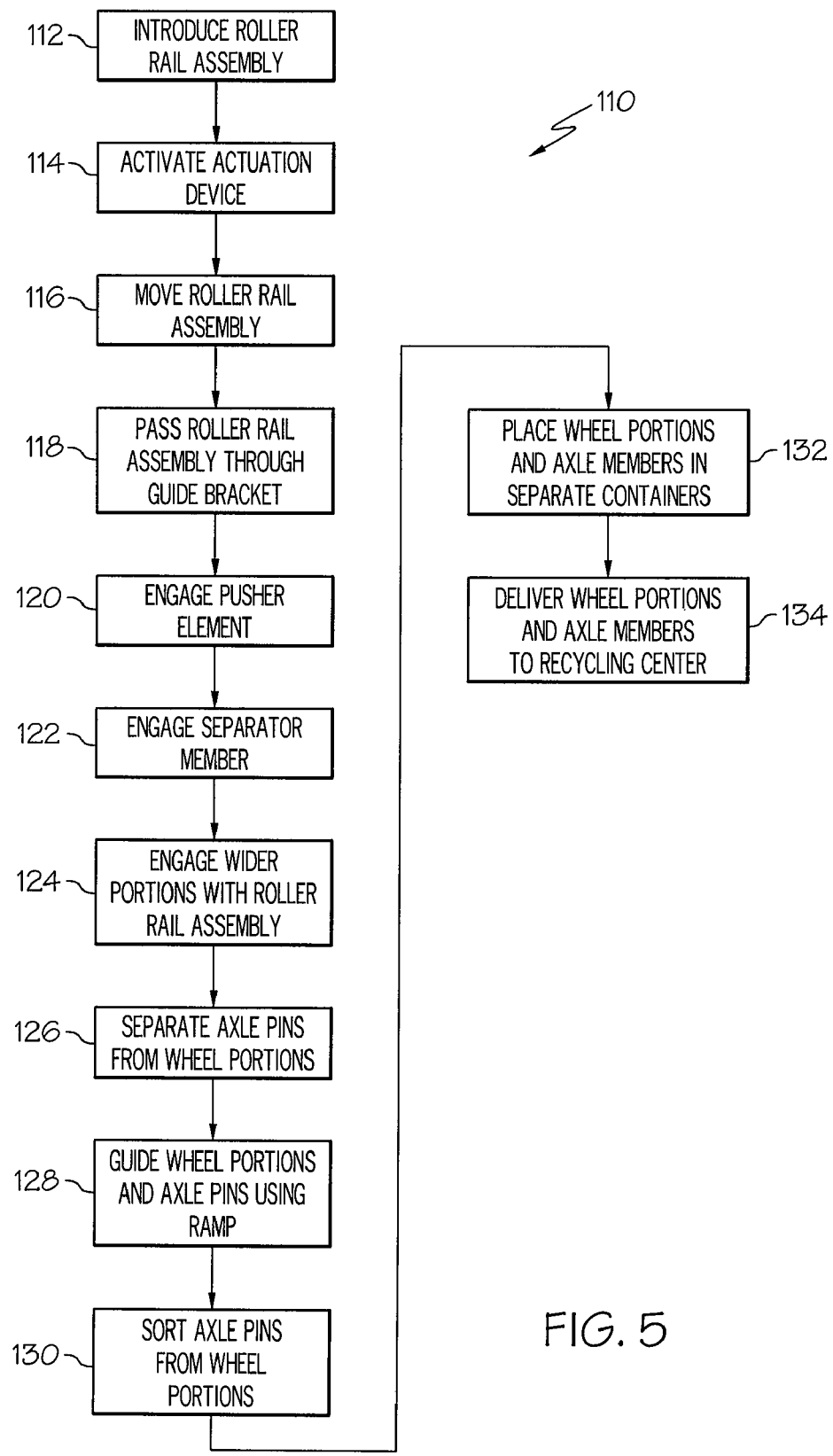
FIG. 5 illustrates a method of disassembling a roller rail assembly using the automated system of FIGS. 1 and 2 according to one or more embodiments described herein.

Referring to FIG. 5, an exemplary embodiment of a method 110 for disassembling a roller rail assembly 12 is shown using the automated system 10. At step 112, an end of the roller rail assembly 12 is introduced to the automated system 10 at the actuation device 14 with the roller wheels 36 facing downward. At step 114, the actuation device 14 is activated and is used to move the roller rail assembly 12 forward at step 116. At step 118, the roller rail assembly 12 passes through one or more of the guide brackets 26. At step 120, the pusher element 38 may engage the roller rail assembly 12 and apply a downward pushing force to the roller wheels 36.

At step 122, the separator member 28 enters the roller rail assembly 12 through an open end of the roller rail assembly 12. Referring also to FIGS. 6 and 7, the separator member 28 may enter the roller rail assembly 22 with the tongs 84 and 86 having the free ends 88 and 90 extending through the open end 91. Depending on the location of the wider portions 96 along the length of the tongs 84 and 86 (e.g., nearer or farther to the mounting portion 80), the wider portions 96 may enter through the open end 91 of the roller rail assembly 12 after or before the narrow portions 94 enter through the open end of the roller rail assembly 12. At step 124, the wider portions 96 of the tongs 84 and 86 engage the sidewalls 34 and 35 of the roller rail assembly 12, forcing the sidewalls away from each other and allowing the roller wheels 36 to fall from the housing member 32 (FIGS. 1 and 7).

Referring again to FIG. 5, at step 126, the axle pins 44 separate from the wheel portions 42. The axle pins 44 may, for example, separate from the wheel portions 42 as the roller wheels 36 fall from the housing member 32. At step 128, the wheel portions 42 and the axle pins 44 may be guided by the guiding ramp member 46 that is used to direct the wheel portions 42 and axle pins 44 toward the separator ramp assembly 48. At step 130, the axle pins 44 may be sorted from the wheel portions 42 at the separator ramp assembly 48. The axle pins 44 and the wheel portions 42 may then be separately collected and placed in separate containers at step 132. At step 134, the separated axle pins 44 and wheel portions 42 may be delivered to a recycling center.

The above-described automated systems can be used in automatically disassembling roller rail assemblies. While the automated systems above illustrate disassembling only one roller rail assembly, the automated systems may be used having multiple components for disassembling multiple roller rail assemblies simultaneously. In some embodiments, the automated systems may be fed with roller rail assemblies continuously, one-after-another. Because various components of the roller rail assemblies may be formed of different materials (e.g., the roller wheels may be formed of a plastic and/or rubber material and the housing member may be formed of a metal material), it may be useful to separate and sort at least some of the components when disassembling the roller rail assemblies. The automated systems described herein can be used to automatically disassemble the roller rail assemblies and sort various components of the roller rail assemblies.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automated system for disassembling a roller rail assembly, the system comprising:
   an actuation device configured to move the roller rail assembly in a disassembling direction;
   a guide bracket having an opening therethrough configured to receive the roller rail assembly as the roller rail assembly is moved in the disassembling direction, the guide bracket allowing movement of the roller rail assembly in the disassembling direction; and
   a separator member located downstream of the actuation device, the separator member being received by a housing member of the roller rail assembly and having a wide region that separates sidewalls of the housing member and releases roller wheels of the roller rail assembly as the roller rail assembly is moved past the separator member by the actuation device.

2. The system of claim 1 further comprising a pusher element that applies a downward pushing force against the roller wheels.

3. The system of claim 2, wherein the pusher element is located between the actuation device and the separator member.

4. The system of claim 1 further comprising a base that supports the separator member.

5. The system of claim 4, wherein the separator member is a fork-shaped member comprising a mounting portion that is mounted upon the base and a pair of tongs having free ends that face back toward the actuation device.

6. The system of claim 5, wherein each tong includes a narrow portion and a wider portion.

7. The system of claim 6, wherein the wider portion of each tong is located between the narrow portion and the mounting portion.

8. The system of claim 6, wherein the narrow portion of each tong is located between the wider portion and the mounting portion.

9. The system of claim 1 further comprising a collecting and sorting assembly configured to receive the roller wheels and provide separate pathways for axle pins of the roller wheels and wheel portions of the roller wheels.

10. An automated system for disassembling a roller rail assembly, the system comprising:
    an actuation device configured to move the roller rail assembly in a disassembling direction;
    a guide bracket having an opening therethrough configured to receive the roller rail assembly as the roller rail assembly is moved in the disassembling direction, the guide bracket allowing movement of the roller rail assembly in the disassembling direction;
    a separator member located downstream of the actuation device, the separator member having a wide region to release roller wheels of the roller rail assembly as the roller rail assembly is moved; and
    a collecting and sorting assembly configured to receive the roller wheels and provide separate pathways for axle pins of the roller wheels and wheel portions of the roller wheels.

11. The system of claim 10, wherein the collecting and sorting assembly comprises a separator ramp assembly comprising a first member comprising a screen and a second member beneath the first member.

12. The system of claim 11, wherein the screen comprises openings sized to allow the axle pins of the roller wheels to fall through the first member and be received by the second member, the openings sized to prevent passage of the wheel portions of the roller wheels through the first member thereby providing the separate pathways.

13. The system of claim 10 further comprising a base that supports the separator member.

14. The system of claim 13, wherein the separator member is a fork-shaped member comprising a mounting portion that is mounted upon the base and a pair of tongs having free ends that face back toward the actuation device.

15. The system of claim 14, wherein each tong includes a narrow portion and a wider portion.

16. A method of disassembling a roller rail assembly, the method comprising:

moving the roller rail assembly in a disassembling direction using an actuation device;

guiding movement of the roller rail assembly using a guide bracket configured to receive the roller rail assembly as the roller rail assembly is moved in the disassembling direction; and separating roller wheels of the roller rail assembly from a housing member of the roller rail assembly using a separator member, the separator member being located downstream of the actuation device, the separator member being received by the housing member of the roller rail assembly and having a wide region that separates sidewalls of the housing member and releases roller wheels of the roller rail assembly as the roller rail assembly is moved past the separator member by the actuation device.

17. The method of claim 16 further comprising separating axle pins and wheel portions of the roller wheels using a collecting and sorting assembly.

18. The method of claim 17, wherein the collecting and sorting assembly comprises a separator ramp assembly comprising a first member comprising a screen and a second member beneath the first member.

19. The method of claim 18, wherein the screen comprises openings sized to allow the axle pins of the roller wheels to fall through the first member and be received by the second member, the openings sized to prevent passage of the wheel portions of the roller wheels through the first member thereby providing separate pathways for the wheel portions and the axle pins.

20. The method of claim 16, wherein the separator member is a fork-shaped member comprising a mounting portion that is mounted upon a base and a pair of tongs having free ends that face back toward the actuation device.

* * * * *

UNITED STATES PATENT AND TRADEMARK OFFICE
Certificate

Patent No. 8,371,011 B2            Patented: February 12, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Todd N. Eggleston, Georgetown, KY (US); Brandon Scott Thompson, Brooksville, KY (US); Lonnie G. Craig, Georgetown, KY (US); Raymond Mead, Mt. Sterling, KY (US); and Lloyd Rodney Holland, Georgetown, KY (US).

Signed and Sealed this Fifteenth Day of October 2013.

DAVID P. BRYANT
*Supervisory Patent Examiner*
Art Unit 3726
Technology Center 3700